(12) United States Patent
You (10) Patent No.: US 10,089,252 B2
(45) Date of Patent: Oct. 2, 2018

(54) USB COMMUNICATION CONTROL METHOD FOR USB ACCESSORY

(71) Applicant: Hyundai Motor Company, Seoul (KR)

(72) Inventor: Hyewon You, Seoul (KR)

(73) Assignee: Hyundai Motor Company, Seoul (KR)

( * ) Notice: Subject to any disclaimer, the term of this patent is extended or adjusted under 35 U.S.C. 154(b) by 43 days.

(21) Appl. No.: 15/370,959

(22) Filed: Dec. 6, 2016

(65) Prior Publication Data

US 2018/0060251 A1 Mar. 1, 2018

(30) Foreign Application Priority Data

Aug. 29, 2016 (KR) .......................... 10-2016-0109970

(51) Int. Cl.
*G06F 13/10* (2006.01)
*G06F 13/42* (2006.01)

(52) U.S. Cl.
CPC ........ *G06F 13/102* (2013.01); *G06F 13/4282* (2013.01); *G06F 13/4295* (2013.01)

(58) Field of Classification Search
CPC .... H04W 56/001; G01S 19/14; G01S 19/235; G06F 1/12; H03L 1/02; H03L 1/026
USPC ............................................ 713/400; 710/63
See application file for complete search history.

(56) References Cited

U.S. PATENT DOCUMENTS

| | | | | |
|---|---|---|---|---|
| 6,553,375 B1 * | 4/2003 | Huang | ...................... | G06F 8/61 |
| 7,334,072 B1 * | 2/2008 | Wright | .................. | G06F 13/385 |
| | | | | 710/10 |
| 7,409,563 B2 * | 8/2008 | Howard | ................ | G06F 21/445 |
| | | | | 439/147 |
| 8,140,650 B2 * | 3/2012 | Pulkkinen | ........... | H04L 41/0803 |
| | | | | 709/217 |
| 8,990,329 B1 * | 3/2015 | Khvostichenko | .. | G06Q 10/1095 |
| | | | | 709/206 |
| 9,414,185 B2 * | 8/2016 | Kurihara | ............... | H04W 4/008 |

(Continued)

FOREIGN PATENT DOCUMENTS

| JP | 2001306413 A | 11/2001 |
|---|---|---|
| JP | 4343973 B2 | 10/2009 |

(Continued)

OTHER PUBLICATIONS

Notice of Allowance for Korean Patent Application No. 10-2016-0109970, dated Apr. 18, 2018, 1 page.

*Primary Examiner* — Paul R. Myers
(74) *Attorney, Agent, or Firm* — Mintz Levin Cohn Ferris Glovsky and Popeo, P.C.; Peter F. Corless (57) ABSTRACT

A USB communication control method, in which a USB host and a USB accessory executing an Android operating system are connected to each other through a USB cable, includes: when an application is executed on the USB accessory, acquiring USB connection information between the USB host and the USB accessory by the application; when the application being executed on the USB accessory is completed, initializing an Android Open Accessory Protocol (AOAP) of the USB accessory by the application by assigning USB control authority to the application; changing the USB connection information between the USB host and the USB accessory to information of a state before the completion of the application; and resuming USB communication between the USB accessory and the USB host.

7 Claims, 8 Drawing Sheets

(56) References Cited

U.S. PATENT DOCUMENTS

| | | | | |
|---|---|---|---|---|
| 2001/0019956 | A1* | 9/2001 | Tada | H04W 52/0232 455/434 |
| 2009/0106833 | A1* | 4/2009 | Wong | G06F 21/31 726/18 |
| 2009/0300710 | A1* | 12/2009 | Chai | G06F 21/6218 726/1 |
| 2013/0167159 | A1* | 6/2013 | Ricci | H04W 4/90 719/319 |
| 2014/0115202 | A1* | 4/2014 | Yoshinaga | G06F 13/426 710/62 |
| 2015/0052615 | A1* | 2/2015 | Gault | G06F 21/60 726/26 |
| 2016/0081135 | A1* | 3/2016 | Kang | H04R 3/00 455/41.2 |
| 2016/0306966 | A1* | 10/2016 | Srivastava | G06F 21/31 |

FOREIGN PATENT DOCUMENTS

| | | |
|---|---|---|
| JP | 2011-008402 A | 1/2011 |
| KR | 2012-0033146 A | 4/2012 |
| KR | 10-1462912 B1 | 11/2014 |
| KR | 2015-0011897 A | 2/2015 |
| KR | 10-1550055 B1 | 9/2015 |
| KR | 10-2016-0036241 A | 4/2016 |

* cited by examiner

USB COMMUNICATION CONTROL METHOD FOR USB ACCESSORY

CROSS-REFERENCE TO RELATED APPLICATION

This application claims the benefit of and priority to Korean Patent Application No. 10-2016-0109970, filed on Aug. 29, 2016 in the Korean Intellectual Property Office, the entire disclosure of which is incorporated herein by reference as if fully set forth herein.

BACKGROUND

1. Technical Field

Embodiments of the present disclosure relate generally to a communication method between a universal serial bus (USB) host and a USB accessory, and more particularly, to a method for controlling USB communication between a head unit of a vehicle and a mobile device of a user.

2. Description of the Related Art

In modern vehicle technology, a mobile device of a user can be connected to a head unit of a vehicle, such that various functions of the mobile device can also be used through the head unit of the vehicle. Wireless communication, such as Wi-Fi or Bluetooth, has been widely used for transmitting data between a mobile device and the vehicle head unit. However, the manufacturing costs of wireless-capable products can be expensive, and significant maintenance costs are needed to achieve stability in wireless communication.

In contrast, wired communication can be used as a substitute for wireless communication. A representative example of wired communication is universal serial bus (USB) cable communication which takes place between a USB host and a USB accessory. The USB cable communication has advantages in that it provides simple and direct communication, provides a power-supply voltage using a USB, and guarantees desired data performance resulting in reduction of radio frequency (RF) design consideration and costs.

In order to connect the USB accessory to the USB host, the USB host is set to a host mode, and the USB accessory is connected to the USB host through the USB cable. When connecting a user's mobile device to the head unit of the vehicle, during the USB host mode, the head unit of the vehicle may operate as the USB host, and the mobile device may operate as the USB accessory.

If the USB host and the USB accessory are operated based on the Android™ operating system, and an application is executed in the USB accessory while the USB accessory is connected to the USB host through the USB cable, USB communication between the USB host and the USB accessory can be interrupted. In order to resume the interrupted USB communication, the USB cable for connecting the USB host to the USB accessory must be physically disconnected from the USB host and the USB accessory and then reconnected to the USB host and the USB accessory.

SUMMARY

Therefore, it is an aspect of the present disclosure to provide a USB communication control method in which, when a USB host and a USB accessory operate based on the Android™ operating system, even though an application is executed in the USB accessory while the USB accessory is connected to the USB host through a USB cable, the USB communication is not interrupted, and the USB cable need not be physically disconnected from the USB host and the USB accessory and then reconnected such that the interrupted USB communication can be resumed.

Additional aspects of the disclosure will be set forth in part in the description which follows and, in part, will be apparent from the description, or may be learned by practice of the disclosure.

In accordance with embodiments of the present disclosure, a universal serial bus (USB) communication control method, in which a USB host and a USB accessory executing an Android operating system are connected to each other through a USB cable, includes: when an application is executed on the USB accessory, acquiring USB connection information between the USB host and the USB accessory by the application; when the application being executed on the USB accessory is completed, initializing an Android Open Accessory Protocol (AOAP) of the USB accessory by the application by assigning USB control authority to the application; changing the USB connection information between the USB host and the USB accessory to information of a state before the completion of the application; and resuming USB communication between the USB accessory and the USB host.

The USB control authority may include: a first authority for confirming list and connection information of the USB accessory connected to the USB host, and a second authority for initializing a USB setting of the USB accessory.

The USB communication control method may further include: confirming list and connection information of the USB accessory by reading data of a device node of a USB accessory folder mounted to a platform of the Android operating system of the USB host.

The USB communication control method may further include: acquiring, by the application, the USB control authority when the application is installed in the USB accessory.

The USB accessory may be a mobile device executing the Android operating system.

The USB host may be a vehicle head unit executing the Android operating system.

The USB communication between the USB accessory and the USB host may resume after execution of the application on the USB accessory is completed.

BRIEF DESCRIPTION OF THE DRAWINGS

These and/or other aspects of the disclosure will become apparent and more readily appreciated from the following description of the embodiments, taken in conjunction with the accompanying drawings of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Reference will now be made in detail to the embodiments of the present disclosure, examples of which are illustrated in the accompanying drawings.

Figure 1:
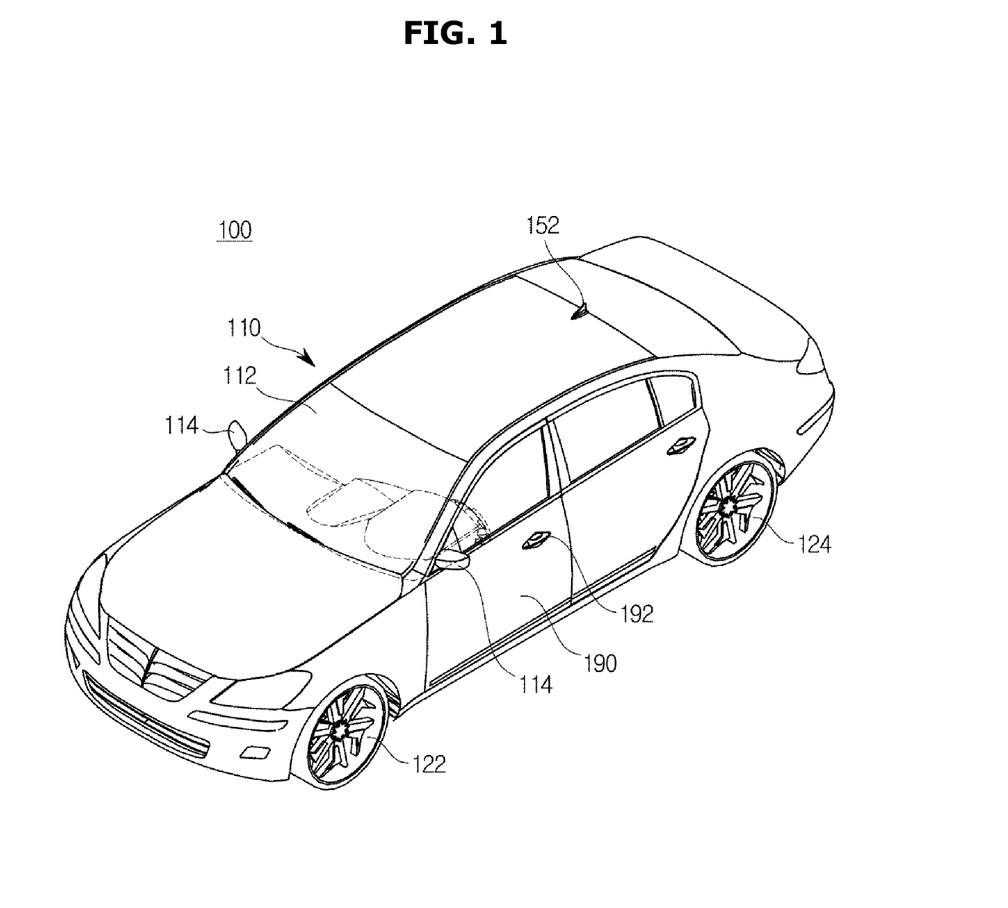
FIG. 1 is a view illustrating an example exterior appearance of a vehicle according to embodiments of the present disclosure.

FIG. 1 is a view illustrating an example exterior appearance of a vehicle according to embodiments of the present disclosure. As shown in FIG. 1, the vehicle 100 may have the following structures. It should be understood that the exterior configuration of the vehicle 100 as demonstrated in FIG. 1 and described herein is provided merely for demonstration purposes and does not limit the scope of the present disclosure. Thus, the exterior configuration of the vehicle 100 can be modified in any suitable manner, as would be understood by a person of ordinary skill in the art, consistent with the scope of the present claims.

A windshield 112 arranged at a front upper portion of the main body 110 may provide a forward view of the vehicle to a vehicle driver who rides in the vehicle, and may protect the vehicle driver from the wind.

Side-view mirrors 114 may include a left side-view mirror provided at the left of the main body 110 and a right side-view mirror provided at the right of the main body 110, so that the driver who rides in the vehicle may obtain visual information of the lateral and rear directions of the vehicle through the side-view mirrors 114. A single left side-view mirror is mounted to the left door 190, and a single right side-view mirror is mounted to the right door 190.

The doors 190 may be rotatably mounted to the left and right sides of the main body 110, so that a driver and passenger can easily ride in or leave the vehicle through the doors 190. When the doors 190 are closed, the doors 190 can shield the indoor space of the vehicle from the outside. The doors 90 can be locked or unlocked using a door lock device 192. A method for locking/unlocking the door lock device 192 may be classified into a first method for allowing the user to approach the vehicle 100 so that the user can directly manipulate the button or lever of the door lock device 192; and a second method for allowing the user to remotely lock or unlock the door lock device 192 using a remote controller or the like at a remote site distant from the vehicle 100.

The antenna 152 may receive broadcast/communication signals, for example, telematics signal, digital multimedia broadcasting (DMB) signal, digital television (TV) signal, global positioning satellite (GPS) signal, etc. The antenna 152 may be a multi-functional antenna configured to receive various kinds of broadcast/communication signals, or may be a single functional antenna configured to receive any one of broadcast/communication signals.

Front wheels 122 may be provided at the front of the vehicle 100, and rear wheels 124 may be provided at the rear of the vehicle 100. The front wheels 122 and the rear wheels 124 may receive drive power from the engine (not shown), so that the front wheels 122 and the rear wheels 124 can rotate.

Figure 2:
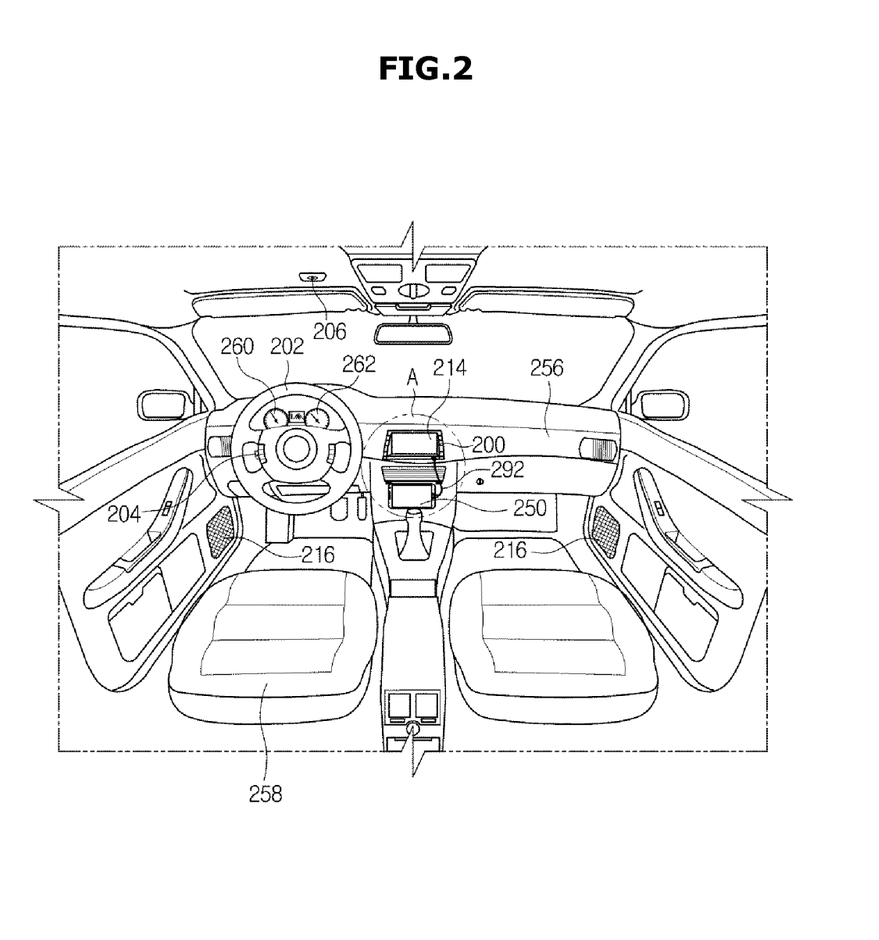
FIG. 2 is a view illustrating an example interior space of the vehicle shown in FIG. 1 according to embodiments of the present disclosure.

FIG. 2 is a view illustrating an example interior space of the vehicle shown in FIG. 1 according to embodiments of the present disclosure. As shown in FIG. 2, the interior space of the vehicle 100 of may have the following structure. It should be understood that the interior configuration of the vehicle 100 as demonstrated in FIG. 2 and described herein is provided merely for demonstration purposes and does not limit the scope of the present disclosure. Thus, the interior configuration of the vehicle 100 can be modified in any suitable manner, as would be understood by a person of ordinary skill in the art, consistent with the scope of the present claims.

The dashboard 256 may protrude from a lower part of the windshield 112 toward the vehicle driver. The dashboard 256 may include a plurality of electronic components needed for the vehicle driver who manipulates the vehicle 100, such that the vehicle driver who looks forward can manipulate various devices mounted to the dashboard 256 using the dashboard 256.

A driver seat 258 is provided at the rear of the dashboard, such that the driver of the vehicle 100 can sit in the driver seat 258. The driver seat 258 is provided at the rear of the dashboard 256, such that the vehicle driver who has a stable posture can drive the vehicle 100 while viewing various devices of the dashboard 256.

The cluster display units (260, 262) located adjacent to the driver seat 258 of the dashboard 256 may display operation information on the vehicle 100. The cluster display units (260, 262) may include a speed gauge 260 for displaying a traveling speed of the vehicle 100, and a revolutions-per-minute (RPM) gauge 262 for displaying a rotation speed of a power system (not shown).

The head unit 200 may be a multimedia device for performing various multimedia functions according to a manipulation command of the vehicle driver and passengers. The head unit 200 may perform a navigation function for navigation, an audio function, and a video function. The head unit 200 includes the audio function, the video function, and the navigation function. If necessary, the head unit 200 may include only some functions, instead of all the audio, video, and navigation functions.

The head unit 200 may include a display 214 for displaying either information regarding the traveling road of the vehicle 100 or the route to a destination designed by the vehicle driver and passenger. In addition, the head unit 200 is electrically coupled to the speaker 216 so that the sound signal of the head unit 200 can be transferred to the speaker 216 and output through the speaker 216.

In addition, the head unit 200 may be connected to the mobile device 250 through wired communication such as a Universal Serial Bus (USB) cable 292. In addition, the head unit 200 may perform near field communication (NFC). The head unit 200 may perform NFC with the mobile device 250 of the registered passenger through the pairing method or the like.

The head unit 200 may operate based on a voice recognition control. For this purpose, a voice recognition button 204 may be mounted to the steering wheel 202, and a microphone 206 may be mounted to an upper part of the driver seat. The voice recognition button 204, the microphone 206, the speaker 216, etc. may be used as auxiliary devices for voice recognition control of the head unit 200.

Referring to FIG. 2, the mobile device 250 may be connected to the head unit 200 so as to communicate with the head unit 200. The mobile device 250 may include a portable communication/computing device such as a smartphone or tablet, and may include an external storage device, for example, an external hard disk drive (HDD), an external solid state drive (SSD), and a USB memory. In addition, an Internet of Things (IoT) device and a streaming service provider may be connected as the mobile devices to the head unit 200. The head unit 200 may receive multimedia content from the mobile device 250, and may output the received multimedia content through the display 214 or the speaker 216 of the head unit 200.

There are various methods for controlling the mobile device 250 to transmit the multimedia content to the head unit 200 in a manner that the multimedia content can be reproduced in the head unit 100. For example, the mobile device 250 may transmit the multimedia content to the head unit using wired/wireless communication channels formed between the mobile device 250 and the head unit 200, and may reproduce the received multimedia content through the head unit 200.

In another method, under the condition that wired/wireless communication channels are formed between the mobile device 250 and the head unit 200, the mirroring image of the multimedia content reproduced by the mobile device 250 may be displayed on the display 214 of the head unit 200. For example, when the mobile device 250 supports "Car Mirroring" such as "Android Auto"™ of Google™™, images of video content or navigation images implemented by the mobile device 250 may be mirrored on the display 214 of the head unit 200.

Figure 3:
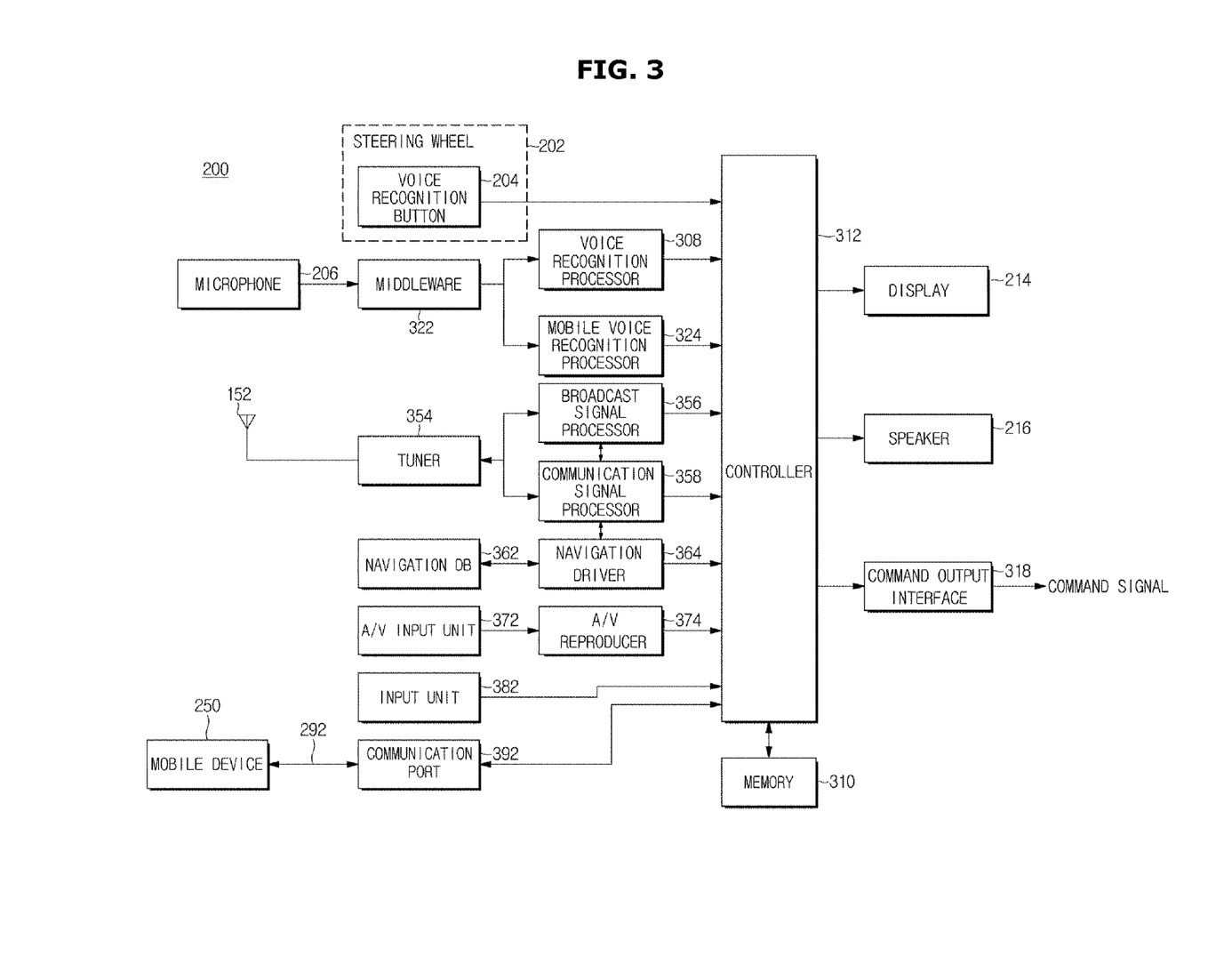
FIG. 3 is a block diagram illustrating a head unit of the vehicle according to embodiments of the present disclosure.

FIG. 3 is a block diagram illustrating the head unit of the vehicle according to embodiments of the present disclosure.

As shown in FIG. 3, the head unit 200 of the vehicle 100 according to the embodiment may include the audio function, the video function, and the navigation function. Although the head unit 200 does not include all of the audio function, the video function, and the navigation function, the head unit 200 may be replaced with another head unit configured to support the car mirroring of the mobile device 250.

As can be seen from FIG. 3, the head unit 200 may be broadly classified into an element for the voice recognition function, an element for the general input function, an element for the broadcast/communication function, an element for the navigation function, an element for the audio/video function, and an element commonly used in the plurality of functions.

The constituent element for voice recognition may include a voice recognition button 204, a microphone 206, a middleware 322, a voice recognition processor 308, and a command output interface 318. Although a mobile voice recognition processor 324 mounted to the server located at a remote site is not used as the constituent element of the head unit 200, the mobile voice recognition processor 324 may be connected to the middleware 322 and the controller 312 of the head unit 200 through the external device (not shown) connected through wired/wireless communication, such that the mobile voice recognition processor 324 can communicate with the middleware 322 and the controller 312 of the head unit 200. The constituent element for the broadcast/communication function may include an antenna 152, a tuner 354, a broadcast signal processor 356, and a communication signal processor 358. The constituent element for the navigation function may include a navigation database (DB) 362 and a navigation driver 364. The constituent element for the audio/video function may include an audio/video (A/V) input unit 372 and an A/V reproducer 374. The constituent element for the general input function may include an input unit 372. The elements commonly used in the plurality of functions may include the memory 310, the controller 312, the display 214, and the speaker 216. The above-mentioned functional division is not limited to the above-mentioned description, and any one functional element may also be used for other functions.

The voice recognition button 204 may allow the vehicle driver or passenger to execute multiple functions of the head unit 200, for example, the audio function, the video function, the navigation function, the information communication function, etc. For this purpose, the voice recognition button may support Push-To-Talk (PTT) one-key manipulation. The voice recognition button 204 may be mounted to the steering wheel 202 which can be easily manipulated by the driver or passenger who rides in the vehicle. The steering wheel 202 may be used to change the traveling direction of the vehicle 100 by moving wheels of the vehicle 100 in a horizontal direction. The passenger (including the vehicle driver) who rides in the vehicle always grasps the steering wheel 202 during vehicle traveling. Thus, assuming that the voice recognition button 204 is mounted to the steering wheel 202, the passenger can easily manipulate the voice recognition button 204 during vehicle traveling. Although the voice recognition button 204 is exemplarily mounted to the steering wheel 202 for convenience of description, it should be noted that the voice recognition button 204 can also be mounted anywhere that the user (e.g., passenger, driver, etc.) can easily manipulate the voice recognition button 204 during vehicle traveling.

During execution of the voice recognition control function, the microphone 206 may receive a voice signal from the driver or passenger, and may convert the received voice signal into electric signals. The microphone 206 may be a microphone installed for voice recognition control, or may share a hands-free microphone of the vehicle 100. In addition, the microphone 206 may be a microphone of the mobile terminal carried by the passenger. When using the microphone of the mobile terminal, the mobile terminal must be connected to the head unit 200 through near field communication such as Bluetooth.

The voice recognition processor 308 of the head unit 200 may receive the electric signal converted by the microphone 206 through the middleware 322, may perform voice recognition of the converted electric signal, and may extract text data indicating voice command information acting as the voice recognition result. The text data extracted by the voice recognition processor 308 may be transferred to the middleware 322, prior to transmission to the controller 312.

The middleware 322 serve as a relay, and may determine whether text data received from the voice recognition processor 308 of the head unit 200 is a reservation word for voice recognition control of the head unit 200 or a reservation word for voice recognition control of the mobile terminal 252. If text data is the reservation word for voice recognition control of the head unit 200, the middleware 322 may transmit the text data to the controller 312 of the head unit 200, and may implement voice recognition control of the head unit 200. In contrast, when the text data is not identical to the reservation word for voice recognition control of the head unit 200, the middleware 322 may transmit the text data to the mobile terminal 252, resulting in implementation of voice recognition control of the mobile terminal 252. That is, the middleware 322 may automatically determine whether the voice signal spoken by the passenger is the reservation word for voice recognition control of the head unit 200 or the reservation word for voice recognition control of the mobile terminal 252, and may relay the determined result. In this case, the passenger intervention for discriminating between the reservation word for voice recognition control of the head unit 200 and the reservation word for voice recognition control of the mobile terminal 252 is unnecessary.

The command output interface 318 may transmit a control command corresponding to voice command information extracted as the voice recognition result from the controller 312 to a control target device.

The antenna 152 may receive or transmit a radio frequency (RF) signal so as to receive a broadcast signal or as well as to transmit/receive a communication signal. The antenna 152 may be connected to the tuner 354 so as to communicate with the tuner 354. Therefore, the RF signal received from the antenna 152 may be transferred to the tuner 354. The antenna 152 may be comprised of a plurality of antennas configured to transceiver different types of broadcast/communication signals. In the embodiment, the antenna 152 may receive DMB broadcast signals, and may receive 3G/LTE telematics signals.

The tuner 354 may convert the radio frequency (RF) signal received from the antenna 152 into an intermediate frequency (IF) signal or the like. In addition, the tuner 354 may convert a data signal to be transmitted into a public signal capable of being propagated in the air, and may transmit the public signal to the air. That is, the tuner 354 may extract only the signal of a specific band, or may combine the data signal with a carrier signal. The tuner 354 may receive the broadcast signal, and may transmit and receive the communication signal. The broadcast signal may include a radio broadcast signal and a DMB broadcast signal. The communication signal may include a satellite communication signal related to a GPS system. In addition, the communication signal may include a telematics communication signal. Information as to which signal will be received and processed by the tuner 354 may be determined by the control signal transferred from the controller 312 to the tuner 354. For example, assuming that the controller 312 generates a control signal needed to receive a radio broadcast signal of a specific channel and outputs the control signal to the tuner 354, the tuner 354 may receive the radio broadcast signal of the corresponding channel in response to the control signal received from the controller 312. If the controller 312 transmits a control signal for transmitting the telematics signal and transmission (Tx) data to the tuner 354, the tuner 354 may convert the Tx data into a signal format capable of being transmitted over the air in response to the control signal from the controller 312, and may transmit the converted signal over the air through the antenna 152. In addition, the tuner 354 may acquire information regarding a broadcast channel contained in the broadcast signal. The broadcast signal applied to the tuner 354 may include a title of a broadcast channel, a service ID (identification), and broadcast data. The tuner 354 may extract the title of the broadcast channel, the service ID, and broadcast data contained in the broadcast signal, and may transmit the extracted information to the broadcast signal processor 356 and the controller 312.

The broadcast signal processor 356 may classify the broadcast signal generated from the tuner 354 into a video broadcast signal and an audio broadcast signal, and may perform a series of signal processing. The series of signal processing achieved by the broadcast signal processor 356 may include analog-to-digital conversion (ADC), and digital-to-analog conversion (DAC), and may include converting video data into a signal format capable of driving the display 214.

The communication signal processor 358 may perform processing of the communication signal with the GPS satellite and may perform processing of the telematics communication signal. That is, the communication signal processor 358 may convert the received communication signal into a data format capable of being transferred to the controller 312. The communication signal processor 358 may receive data to be transmitted from the tuner 354 and the antenna 152, and may convert the received data into a communicable signal format.

The navigation DB 362 may include data for implementing navigation. The navigation DB 362 may be a memory card or a Digital Versatile Disc (DVD) format. In addition, navigation data received from the mobile terminal connected to the wired/wireless link (e.g., Android Auto™) may also be used as the navigation DB.

The navigation driver 364 may construct a navigation screen image on the display 214 using data received from the navigation DB 362. For this purpose, navigation setting information, such as a destination, a waypoint, and a route type established by the passenger, may be received from the controller 312. In addition, for navigation implementation, current position information of the vehicle 100 obtained through communication with the GPS satellite may be received from the controller 312.

The A/V input unit 372 may be an optical disc drive. In another example, the A/V input unit 372 may be a USB input/output (I/O) device or an auxiliary (AUX) I/O terminal. Alternatively, the A/V input unit 372 may be a Bluetooth device for wireless connection to the mobile terminal. The mobile terminal connected to the A/V input unit 372 through Bluetooth may be a mobile phone or a portable digital sound source player.

The A/V reproducer 374 may output A/V data received through the input unit 372 to the speaker 216 or the display 214. For example, when the A/V input unit 372 is an optical disc drive, the optical disc drive may read A/V data written in the optical disc (CD, DVD, BD, etc.), and may retrieve the read A/V data. The A/V reproducer 374 may convert A/V data retrieved by the A/V input unit 372 into a signal capable of driving the speaker 216 or the display 214, and may transmit the converted signal to the speaker 216 or the display 214, such that A/V data can be reproduced. A/V data received from other media other than the optical disc may pass through the A/V reproducer 374, and may be converted into a signal capable of driving the speaker 216 or the display 214.

The input unit 382 may be at least one button mounted to the head unit 200, or a touchscreen implemented on the display 214. The passenger may select one of the multiple functions of the head unit 200 through manipulation of the input unit 382, and may perform various setting actions in a manner that a desired task can be performed from the selected function. The voice recognition button 204 of the steering wheel 202 may be contained in the at least one button constructing the input unit 382.

For example, the communication port 392 may include a USB port, a FireWire port, or the like. A communication cable is inserted into the communication port 392, and the head unit 200 can be connected to the mobile device 250 connected to the communication cable, such that the head unit 200 can communicate with the mobile device 250. In addition, the communication port 392 may be implemented for short range wireless communication, for example, Bluetooth, Wi-Fi, ZigBee, NFC, etc. The communication port 392 for the short-range wireless communication may receive a remote control signal from the mobile device (e.g., smartphone, tablet, laptop, etc.) 250, and may transmit the received remote control signal to the controller 312 of the head unit 200 or another electronic control unit (ECU). In this case, the remote control signal may be a remote control signal for locking/unlocking the doors 190, or may be a remote control signal for starting/stopping the engine.

The controller 312 may perform necessary control in association with the overall operation of the head unit 200. For example, the initial entry screen image for performing the voice recognition function in response to manipulation of the voice recognition button 204 may be displayed on the display 214, or a voice message related to the voice recognition function may be output through the speaker 216. In addition, the controller 312 may receive voice command information from the voice recognition processor 308, and may generate a control command corresponding to the corresponding voice command information, such that control corresponding to the voice command information can be achieved. In addition, the controller 312 may process broadcast/communication signals. If A/V data generated after processing of the broadcast/communication signals must be output to the speaker 216 or the display 214, the corresponding A/V data is transferred to the speaker 216 or the display 214, such that necessary A/V data can be output. In addition, assuming that the passenger selects the navigation function, the controller 312 may control the navigation DB 362, the navigation driver 364, the display 214, and the speaker 216, resulting in implementation of navigation. The controller 312 may control A/V data received through the A/V input unit 372 to be reproduced by the A/V reproducer 374, and may transmit the reproduced A/V data to the speaker 216 or the display 214, such that necessary A/V data can be output. In addition, the controller 312 may convert a title of a broadcast channel extracted from the broadcast signal into text data, and may transmit the converted title to the voice recognition processor 308.

The memory 310 may store various applications needed to perform the voice recognition function, the broadcast/communication function, the navigation function, and the A/V function of the head unit 200, and may store screen display data needed to execute the applications, voice data, sound effect data, etc.

The display 214 may output video data needed when the multiple functions of the head unit 200 (e.g., the voice recognition function of the head unit 200, the broadcast/communication function, the navigation function, the A/V function, etc.) are performed. For example, information screen images, messages, video data, etc. of the respective functions may be output through the display 214. In addition, the display 214 may display a user interface (UI) for allowing the passenger to manipulate the plurality of functions of the head unit 200. For example, the user interface (UI) needed for the user who desires to perform the navigation function, the broadcast (radio/DMB) function, the air-conditioning function, and the other audio function of the head unit 200 may be displayed on the display 214. However, in order for the vehicle driver to concentrate on the safe driving during traveling of the vehicle 100, display of video content through the display 214 may be limited.

The speaker 216 may output audio data needed when multiple functions of the head unit 200 (e.g., the voice recognition function, the broadcast/communication function, the navigation function, the A/V function, etc.) are performed. For example, voice messages, the sound effect, and audio data of the respective functions may be output through the speaker 216.

Figure 4:
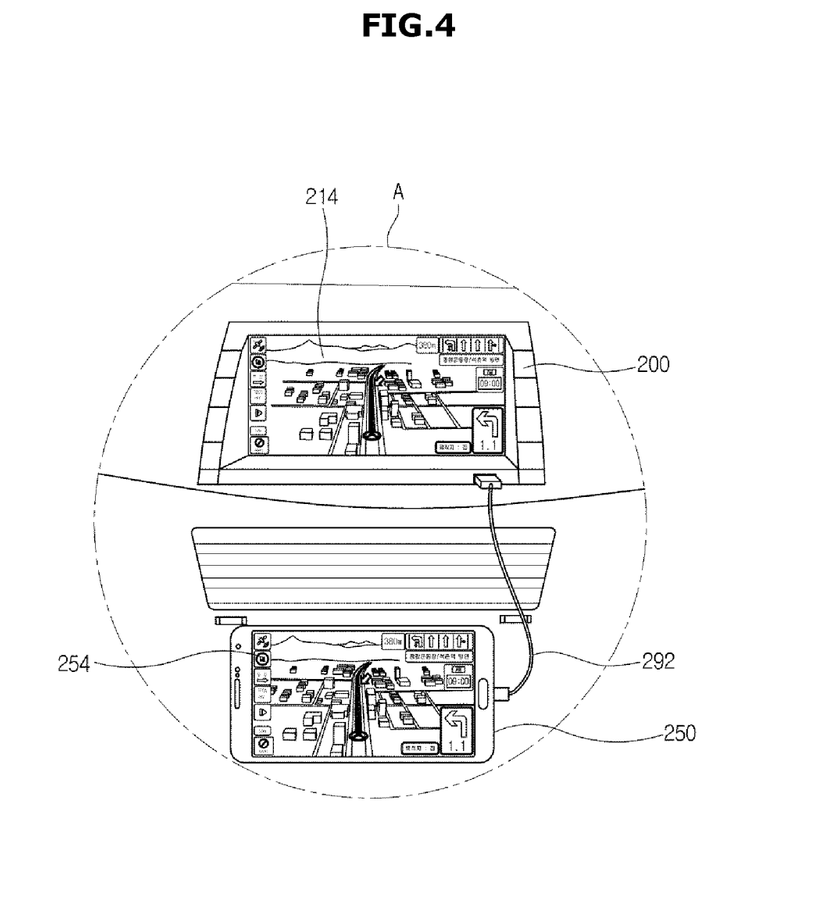
FIG. 4 is a conceptual diagram illustrating USB connection between a head unit and a mobile device according to embodiments of the present disclosure.

FIG. 4 is a conceptual diagram illustrating USB connection between a head unit and a mobile device according to embodiments of the present disclosure. As shown in FIG. 4, the head unit 200 of the vehicle 100 may be connected to the mobile device 250 of the user through the USB cable 292. Of course, the head unit 200 of the vehicle 100 may be wirelessly connected to the mobile device 250 of the user. If the head unit 200 of the vehicle 100 is connected to the mobile device 250 of the user by wire or wirelessly, the car mirroring function can be performed. The car mirroring function may control the head unit 200 of the vehicle 100 to interact with the mobile device 250 in a manner that content displayed on the display 254 of the mobile device 250 is also displayed on the display 214 of the head unit 200, such that not only reproduction of the multimedia content implemented in the mobile device 250, but also confirmation of the navigation, the voice call, and the message reception may also be displayed on the display 214 of the head unit 200. The above-mentioned car mirroring may utilize the large-sized display 214 of the head unit 200, instead of utilizing the small-sized display 254 of the mobile device 250. Since the voice recognition function supported only by the mobile device 250 can also be utilized in the head unit 200 of the vehicle 100, the car mirroring function is very useful. A representative example of the car mirroring function is "Android Auto" of Google. The above-mentioned car mirroring can be normally operated on the condition that the head unit 200 of the vehicle 100 is connected to the mobile device 250 of the user by wire or wirelessly.

Figure 5:
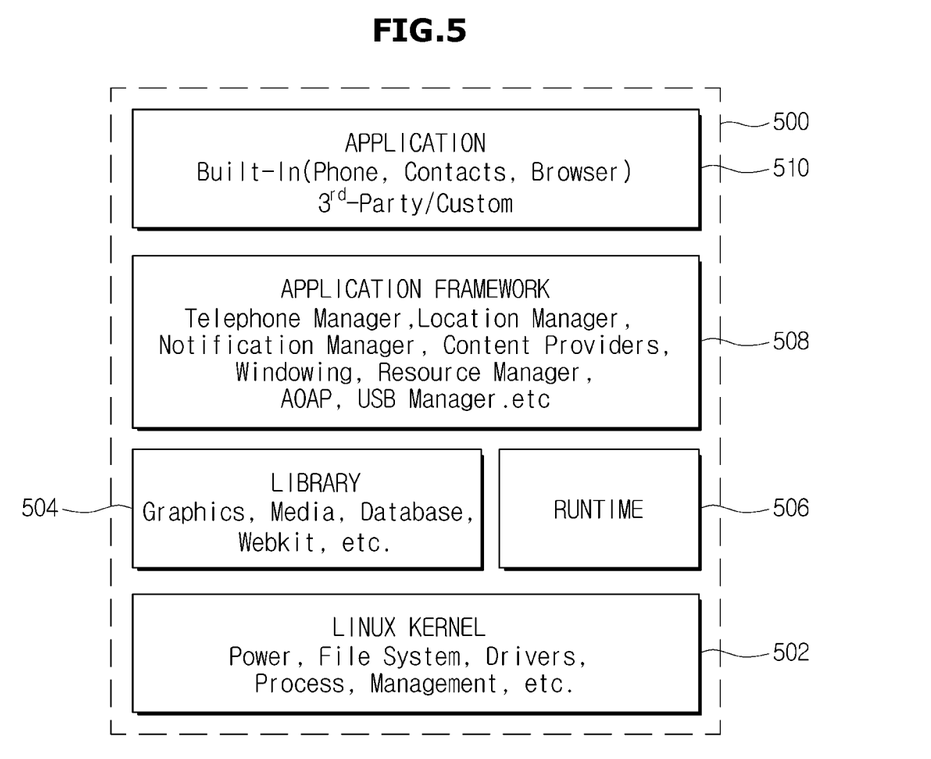
FIG. 5 is a conceptual diagram illustrating an example Android platform mounted to the mobile device.

FIG. 5 is a conceptual diagram illustrating an Android platform mounted to the mobile device. As shown in FIG. 5, the Android operating system may be installed in the mobile device 250 (e.g., smartphone, tablet, laptop, etc.) based on Android. The Android platform 500 of FIG. 5 is mounted to the mobile device 250 such that the Android platform 500 may operate as the Android operating system. The Android platform 500 may be composed of a plurality of layers including a Linux kernel 502, a library 504, an application framework 508, and an application 510.

The Linux kernel 502 may be located at the lowest layer of the Android platform 500. The Linux kernel 502 may function as the operating system (OS) of the Android platform 500. That is, if the Android platform 500 is mounted to the mobile device 250, the Linux kernel 502 may operate at the OS of the mobile device 250. The Linux kernel 502 may perform various tasks of the mobile device 250, for example, power supply, power system management, multitasking support, memory management, process execution/management, etc. In addition, the Linux kernel 502 may provide various device drivers for network interfacing and hardware interfacing.

The device drivers provided from the Linux kernel 502 may include a display driver, a USB driver, a Bluetooth driver, a camera driver, a binder driver, a shared memory driver, an audio driver, a Wi-Fi driver, etc. The USB driver from among the above-mentioned drivers may support USB communication between the USB host and the USB accessory. In the USB accessory mode, under the condition that the mobile device 250 of the user is connected to the head unit 200 of the vehicle 200 through the USB cable 292, the head unit 200 may act as the USB host and the mobile device 250 may act as the USB accessory.

The library 504 of the Android platform 500 may be located at an upper layer of the Linux kernel 502. The library 504 of the Android platform 500 may include the standard Java library and the Android Library. The standard Java library may support general tasks, for example, character string processing, file processing, networking, etc. The Android library may be various Java libraries specialized for Android application development. The Android library may implement user interface (UI) creation, graphics processing, database (DB) access, etc.

The RunTime 506 of the Android platform 500 may be located at an upper layer of the Linux kernel 502, and the upper layer of the Linux kernel 502 may be located at the same level layer as the library 504. The RunTime 506 of the Android platform 500 may be a virtual machine for executing the Android application written in Java. The reason why a single application is easily driven simultaneously while maintaining compatibility in various environments including different types of chipsets and different hardware conditions is the presence of the RunTime 506.

Java application may be compiled into byte code, and the byte code is distributed and installed. Whenever the Java application is executed, the byte code is converted into executable code in the RunTime acting as the virtual machine. Dalvik has been mainly used in the RunTime. In the version developed after Kit Kat from among Android versions, the Android RunTime (ART) is added to this version, and one of the Dalvik and the Android RunTime (ART) can be selected.

The application framework 508 in the Android platform 500 may be located at the upper layer of the library 502 and the RunTime 506. The above-mentioned library 504 may also be identified as the same layer as in the application framework 508.

The application framework may be a group of classes configured to implement the application standard structure for the Android platform 500. The application framework 508 may provide the cooperation-type software environment to facilitate the development of software applications or solution.

The application framework 508 may include various managers. That is, the application framework 508 may include a telephone manager, a location manager, a notification manager, at least one content provider, a window manager (Windowing), a resource manager, an Android Open Accessory Protocol (AOAP), a USB manager, etc. in the application framework 508. The AOAP may perform data communication in byte units through USB communication in the Android environment. The USB manager may enumerate the list of USB accessories connected to the USB host, may conduct device open requesting for communication as well as authority requesting.

The application 510 may be a group of the application software executed in the Android environment.

The application 510 may be classified into a basic application, a third party application, a custom application, etc. The application 510 may also be referred to as an "App". The basic application was installed as the factory default setting in the device (e.g., the mobile device 250) including the Android platform 500. For example, the telephone application, the address book application, the Web browser, etc. may be contained in the basic application 510. Third-Party Application may be the application provided from the external application provider.

Most free/charged applications provided through Google Play™ of Google™ or App Store™ of Apple™ may correspond to third-party applications. Android Auto may be one of third party applications for vehicles based on Google Play. Custom Application is an application specialized for a specific user. As an example of Custom Application, vehicle telematics application provided to customers who purchase a specific vehicle manufactured by a specific vehicle company may be used.

Figure 6:
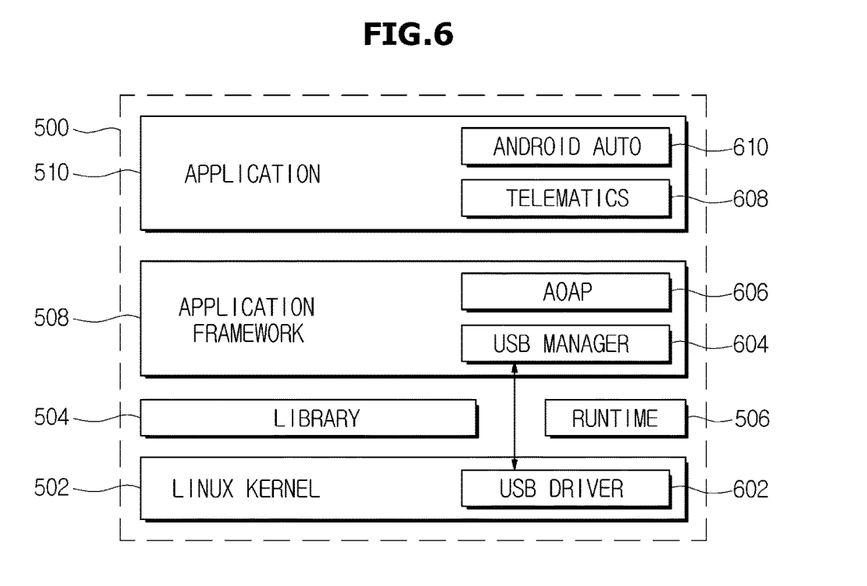
FIG. 6 is a block diagram illustrating USB connectivity control for use in the example Android platform shown in FIG. 5.

FIG. 6 is a block diagram illustrating USB connectivity control for use in the Android platform shown in FIG. 5. In FIG. 6, under the condition that the head unit 200 is connected to the mobile device 250 through a USB cable and the Application (e.g., Vehicle Application such as Android Auto 610 or Telematics Application 608) is being executed in the mobile device 250, if the executing application 510 is mandatorily completed by the user, although the corresponding application 510 is re-executed, USB communication between the vehicle 100 and the mobile device 250 is not achieved.

If the mobile device 250 is connected to the USB accessory (e.g., the head unit 200) through the USB cable 292, the Linux kernel 502 of the mobile device 250 may receive a protocol packet from the head unit 200, may sequentially read and write the File Descriptor among the Linux kernel 502, the application framework 508, and the application 510 in response to the received protocol packet, and may transmit the protocol packet to the head unit 200 of the Linux kernel 502. Only when the above-mentioned process is normally achieved, USB communication between the head unit 200 and the mobile device 250 is normally achieved. However, assuming that the application is mandatorily completed by the user, although the Linux kernel 502 of the mobile device 250 receives the protocol packet from the head unit 200, read/write (R/W) operations of the file descriptor are not achieved among the Linux kernel 502, the application framework 508, and the application 510 of the mobile device 250, such that normal USB communication is not achieved between the head unit 200 and the mobile device 250.

Assuming that USB communication is interrupted for the above-mentioned reason when the application 510 is mandatorily completed, after physical USB connection (e.g., connection through the USB cable 292) between the head unit 200 and the mobile device 250 is mandatorily released, the physical USB connection must be re-performed so that USB communication between the head unit 200 and the mobile device 250 can be normally achieved. In this case, "mandatory completion" of the application may not indicate that the corresponding application is terminated through a self-completion function of the application, and may indicate that the corresponding application is mandatorily completed by the operation manager of the system or by the application manager.

Figure 7:
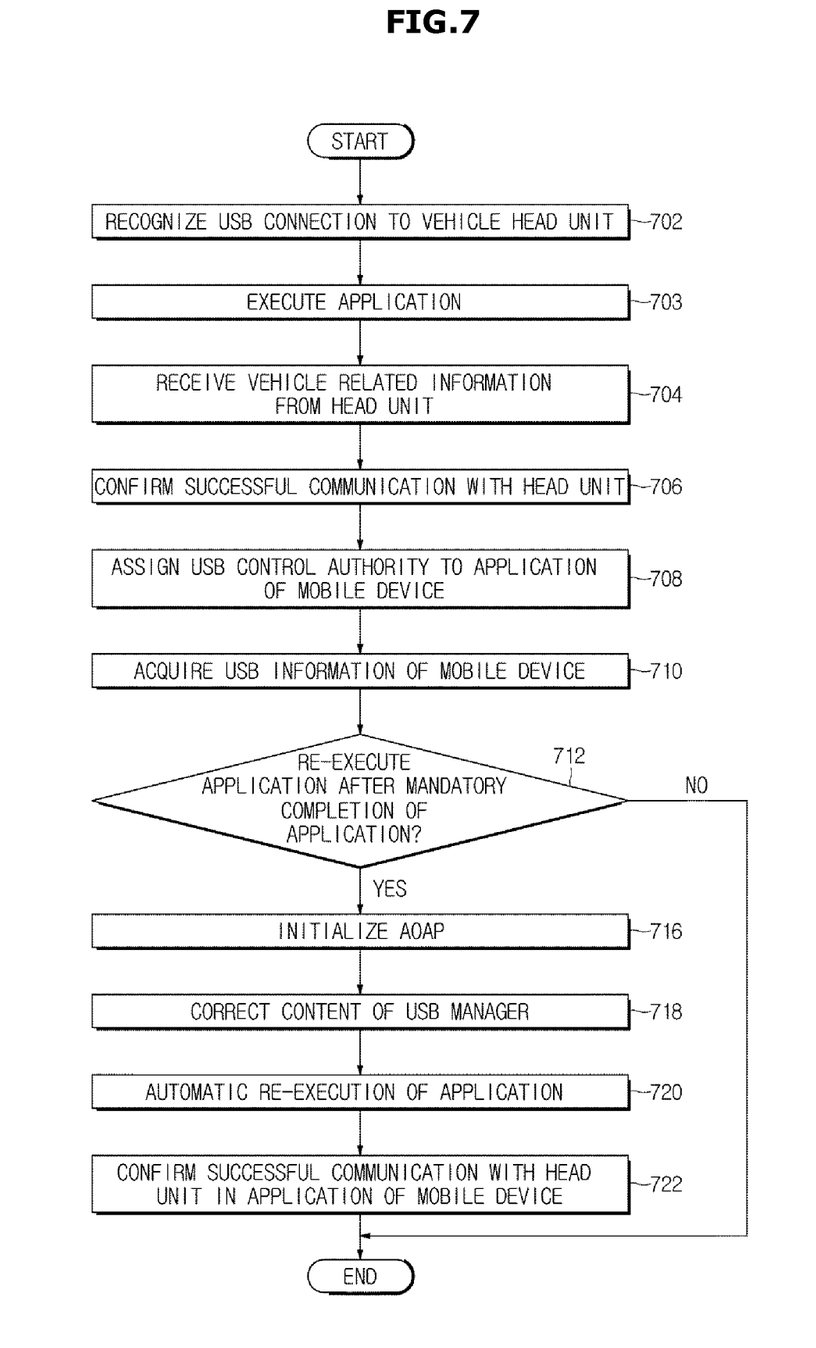
FIG. 7 is a flowchart illustrating a USB communication control method according to embodiments of the present disclosure.

However, in order to solve USB communication interruption caused by mandatory completion of the application 510 being executed in the mobile device 250, USB control authority is assigned to the application 510 to be performed in the mobile device 250 so that the AOAP 606 is initialized, content written in the USB manager 604 is changed to modify a previous record written before mandatory completion of the application, such that USB communication between the head unit 200 acting as the USB host and the mobile device 250 acting as the USB accessory can be smoothly resumed. The USB driver 602 may provide the environment in which the mobile device 250 can perform USB communication in conjunction with another USB host. ambiguity FIG. 7 is a flowchart illustrating a USB communication control method according to embodiments of the present disclosure. As shown in FIG. 7, under the condition that two devices each having the Android platform are connected to each other through the USB cable and USB communication is achieved, the application being executed in any one device is mandatorily completed by the user, although the application mandatorily completed by disconnection of USB communication between two devices is re-performed, USB communication is not resumed and remains interrupted. Typically, in order to solve the above-mentioned issues, USB cable connection between two devices must be released, and the application must then be executed, such that USB communication can be resumed. In accordance with the USB communication control method of FIG. 7, although the application being executed in the USB accessory connected to the USB host through the USB cable 292 is mandatorily completed, if the AOAP 606 of the Android platform 500 of the mobile device 250 acting as the USB accessory is initialized and the USB manager 604 is modified without re-coupling of the physical connection of the USB cable 292 after release of physical connection of the USB cable 292, USB communication with the head unit 200 acting as the USB host can be resumed.

If the USB host and the USB accessory (e.g., the head unit 200 of the vehicle 100 and the mobile device 250 of the user) each having the Android platform 500 are connected to each other through the USB cable 292, the Android platform 500 of the mobile device 250 may recognize USB connection to the head unit 200 through exchange of predetermined communication packets through the USB cable 292 in operation 702.

Under the condition that the head unit 200 and the mobile device 250 are connected to each other through the USB cable 292 such that USB communication is achieved between the head unit 200 and the mobile device 250, the application 510 installed in the mobile device 250 may be executed by the user.

Under the condition that USB communication is achieved between the head unit 200 and the mobile device 250, the mobile device 250 may receive unique information of the vehicle 100 from the head unit 200 in operation 704. Unique information of the vehicle 100 may include, for example, a registration number, a unique number assigned for telematics services, GPS coordinates indicating the current position, etc.

The application 510 of the mobile device 250 may receive unique information of the vehicle 100 from the head unit 200, such that it confirms whether communication with the vehicle 100 is successfully achieved in operation 706.

In the mobile device 250, the USB manager 604 of the Android platform 500 may assign the USB control authority to the application 510 in operation 708. The USB control authority assigned to the application 510 may include a first authority for confirming the list of USB accessories connected to the mobile device 250 and connection information of the USB accessories; and a second authority for initializing USB setting of the mobile device 250.

The USB control authority assigned from the USB manager 604 to the application 510 in the mobile device 250 may control the application 510 to initialize the USB setting when USB communication between the head unit 200 and the mobile device 250 is interrupted due to mandatory completion of the application 510 in the mobile device 250. USB setting is initialized using the authority received from the application 510 of the mobile device 250, such that USB communication between the head unit 200 and the mobile device 250 can be resumed.

The above-mentioned operation in which the application 510 executed in the mobile device 250 receives the USB control authority from the USB manager 604 has already been disclosed in operation 708. The application 510 having received the USB control authority may acquire USB information of the head unit 200 using the received USB control authority in operation 710. In this case, the USB information may include not only the list of USB accessories connected to the head unit 200 acting as the USB host, but also connection information of the USB accessories. The mobile device 250 of the user may act as the USB accessory on the basis of the head unit 200 in the host mode.

In the mobile device 250, the application 510 may read data of a device node of a USB accessory folder (/dev/usb_accessory) mounted to the application framework 508 of the Android platform 500, such that the application 510 may acquire the list of USB accessories and connection information thereof. As a result, the application of the mobile device 250 may acquire information regarding all USB accessories connected to the head unit 200.

In the Android platform 508 of the mobile device 250, the application 510 may acquire the file descriptor from USB information received from the application framework 508, and may transmit and receive data to and from the USB accessory (i.e., the head unit 200) through a file input stream (FileInputStream) and a file output stream (FileOutputStream) of the file descriptor.

Under this situation, the application 510 executed in the mobile device 250 may be completed (or mandatorily completed) by the user, and may then be resumed as necessary in operation 712. In this case, "Mandatory Completion" may indicate that the corresponding application is not finished by the completion function of the corresponding application, and is finished by the operation manager or the application manager.

Although the completed application 510 is re-executed, USB communication between the head unit 200 and the mobile device 250 is not resumed, and physical initialization in which connection of the USB cable 292 is manually disconnected and reconnected is needed. The embodiments of the present disclosure initialize the AOAP 606 and modifies the USB manager 604, such that USB communication between the USB host and the USB accessory (i.e., the head unit 200 and the mobile device 250) can be resumed through software control, without execution of the mandatory release processing of the USB cable 292 (See the following operations 716 and 718).

If the application 510 executed in the mobile device 250 is mandatorily completed by the user in operation 712, the application 510 may initialize the AOAP 606 of the application framework 508 in operation 716. In this case, since the application 510 is not executed, the AOAP 606 may be initialized by background processing.

The application 510 may initialize the AOAP 606, may reflect accessory connection information of the USB host (i.e., the head unit 200) connected to the mobile device 250, and may correct the USB accessory list and connection information of the USB manager 604 in operation 718. Since USB information of the head unit 200 has already been acquired in operation 710, the USB accessory list and connection information may be changed to information regarding a state before such mandatory completion.

As described above, after the AOAP 606 of the application framework 508 is initialized, the USB accessory list and connection information of the USB manager 604 is modified into information regarding the state before mandatory completion, resulting in implementation of the effect acquired when connection through the USB cable 292 between the head unit 200 and the mobile device 250 is released and then re-connected.

After initialization of the AOAP 606 of the application framework 508, the USB accessory list and connection information of the USB manager 604 is changed to information regarding the state before the mandatory completion of the application 510. Thereafter, if USB communication between the head unit 200 and the mobile device 250 is resumed, the Android platform 500 of the mobile device 250 may automatically re-execute the mandatorily completed application 510 in operation 720.

As described above, according to the USB communication control method of the present disclosure, when USB communication between the head unit 200 and the mobile device 250 is interrupted due to mandatory completion of the application 510 in the mobile device 250, the application 510 initializes the USB setting by software so as to resume USB communication between the head unit 200 and the mobile device 250, such that a physical process in which the USB cable 292 is released and then re-connected is no longer required.

The re-executed application 510 may attempt communication with the head unit 200 of the vehicle 100 such that it confirms whether communication is normally achieved in operation 722.

Figure 8:
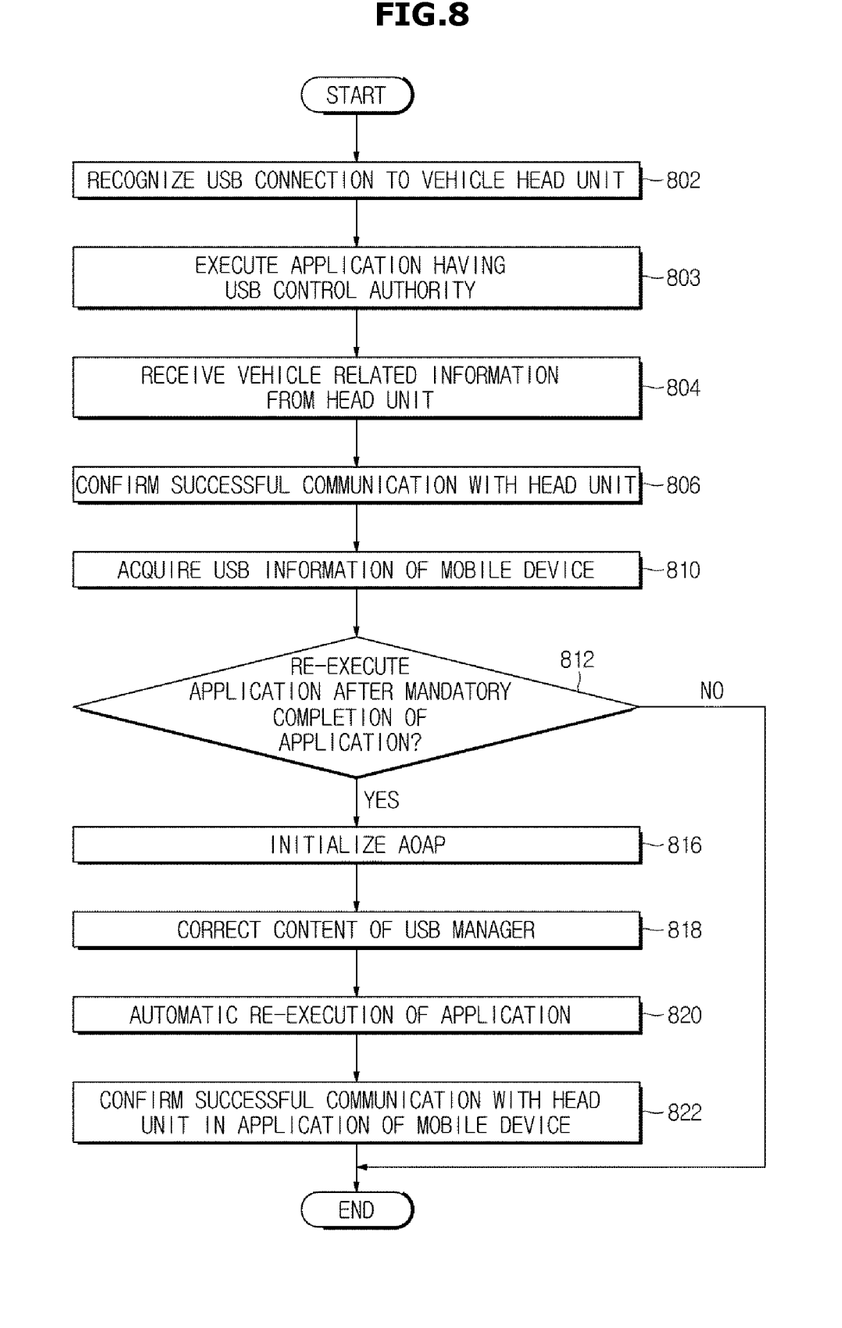
FIG. 8 is a flowchart illustrating an additional USB communication control method according to embodiments of the present disclosure.

FIG. 8 is a flowchart illustrating an additional USB communication control method according to embodiments of the present disclosure. The USB communication control method of FIG. 8 is different from the USB communication control method of FIG. 7 in terms of some aspects. After execution (703) of the application 510 as shown in FIG. 7, the USB control authority is assigned to the application 510 of the mobile device 250 in operation 710. Differently from FIG. 7, the USB control authority is not assigned to the pre-executed application 510 and the application 510 having the USB control authority is executed in operation 803, as shown in FIG. 8. That is, the application 510 executed in the embodiment of FIG. 8 is configured to pre-receive the USB control authority when the mobile device 250 is installed. The subsequent operations are identical to those of the embodiment of FIG. 7.

As is apparent from the above description, according to the USB communication control method, when a USB host and a USB accessory are operated based on the Android operating system, although the application executed in the USB accessory is completed while the USB accessory is connected to the USB host through a USB cable, the USB cable for connecting the USB host to the USB accessory need not be physically released from the USB host and the USB accessory, such that the interrupted USB communication can be resumed.

Although embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A universal serial bus (USB) communication control method, in which a USB host and a USB accessory executing an Android operating system are connected to each other through a USB cable, the method comprising:
   when an application is executed on the USB accessory, acquiring USB connection information between the USB host and the USB accessory by the application;
   when the application being executed on the USB accessory is completed, initializing an Android Open Accessory Protocol (AOAP) of the USB accessory by the application by assigning USB control authority to the application;
   changing the USB connection information between the USB host and the USB accessory to information of a state before the completion of the application; and
   resuming USB communication between the USB accessory and the USB host.

2. The USB communication control method according to claim 1, wherein the USB control authority includes:
   a first authority for confirming list and connection information of the USB accessory connected to the USB host, and
   a second authority for initializing a USB setting of the USB accessory.

3. The USB communication control method according to claim 1, further comprising:
   confirming list and connection information of the USB accessory by reading data of a device node of a USB accessory folder mounted to a platform of the Android operating system of the USB host.

4. The USB communication control method according to claim 2, further comprising:
  acquiring, by the application, the USB control authority when the application is installed in the USB accessory.

5. The USB communication control method according to claim 1, wherein the USB accessory is a mobile device executing the Android operating system.

6. The USB communication control method according to claim 1, wherein the USB host is a vehicle head unit executing the Android operating system.

7. The USB communication control method according to claim 1, wherein the USB communication between the USB accessory and the USB host is resumed after execution of the application on the USB accessory is completed.

* * * * *